United States Patent
Jang

(10) Patent No.: US 6,282,408 B1
(45) Date of Patent: Aug. 28, 2001

(54) APPARATUS AND METHOD FOR MEASURING AIR INTERFERENCE OF A BASE STATION

(75) Inventor: Ki-seong Jang, Seoul (KR)

(73) Assignee: Samsung Electronics Co., Ltd. (KR)

( * ) Notice: Subject to any disclaimer, the term of this patent is extended or adjusted under 35 U.S.C. 154(b) by 0 days.

(21) Appl. No.: 09/207,698

(22) Filed: Dec. 8, 1998

(30) Foreign Application Priority Data

Dec. 9, 1997 (KR) ................................................ 97-066983

(51) Int. Cl.[7] .................................................... H04B 17/00
(52) U.S. Cl. ........................ 455/67.3; 455/63; 455/67.1; 455/561
(58) Field of Search ........................................ 455/423, 424, 455/67.1, 67.4, 67.3, 115, 226.1, 63, 561; 324/76.1, 618, 56.1, 63

(56) References Cited

U.S. PATENT DOCUMENTS

| | | | |
|---|---|---|---|
| 4,837,801 | 6/1989 | Shimura | 379/61 |
| 5,179,722 | 1/1993 | Gunmar et al. | 455/33.1 |
| 5,371,760 | * 12/1994 | Allen et al. | 375/210 |
| 5,428,815 | 6/1995 | Grube | 455/33.1 |
| 5,430,761 | 7/1995 | Bruckert et al. | 375/200 |
| 5,603,093 | 2/1997 | Yoshimi et al. | 455/63 |
| 5,608,331 | * 3/1997 | Newberg et al. | 324/613 |
| 5,708,869 | 1/1998 | Suzuki et al. | 397/77 |
| 5,745,484 | 4/1998 | Scott | 370/347 |
| 5,799,243 | 8/1998 | Ojaniemi | 455/63 |
| 5,832,368 | 11/1998 | Nakano et al. | 455/63 |
| 5,838,671 | 11/1998 | Ishikawa et al. | 370/335 |
| 5,937,005 | * 8/1999 | Obuchi et al. | 375/224 |
| 5,975,180 | * 11/1999 | Durinck | 156/510 |
| 6,023,463 | * 2/2000 | Wiedeman et al. | 370/344 |
| 6,046,987 | * 4/2000 | Tagawa | 370/252 |
| 6,057,690 | * 5/2000 | Buckley | 324/613 |
| 6,067,449 | * 5/2000 | Jager | 455/277.2 |

* cited by examiner

Primary Examiner—Daniel Hunter
Assistant Examiner—Yemane Woldetatios
(74) Attorney, Agent, or Firm—Dilworth & Barrese, LLP

(57) ABSTRACT

Apparatus and method for measuring air interference of base station is disclosed. The apparatus for measuring air interference of base station includes RF (Radio Frequency) switch setting measurement path to selectively measure each path and sector, which is outputted from the base station. A low noise amplifier (LNA) receives the signal output from the RF switch and amplifies the signal to be within an effective level to be read in a spectrum analyzer. A control computer controls the decoding unit and spectrum analyzer as a core of the air interference measurement set (AIMS). The decoding unit generates a decode-output to control the RF switch by receiving data from parallel port of the control computer, and the spectrum analyzer automatically performs interference-measurement in a remote state by receiving the output signal of the low noise amplifier (LNA) and then transmitting and receiving data with the control computer through general purpose interface bus.

11 Claims, 4 Drawing Sheets

APPARATUS AND METHOD FOR MEASURING AIR INTERFERENCE OF A BASE STATION

FIELD OF THE INVENTION

The present invention relates to wireless communication systems, and more particularly, an apparatus and method for measuring air interference of a base station.

DESCRIPTION OF THE RELATED ART

It is not necessary to consider air interference in the prosperity of wired communication. Air interference inevitably exists in wireless communication and causes problems such that the air interference is critical to the integrity of a cellular network in a mobile communication system. The market size of present wireless communication systems has grown by geometrical progression from he early AMPS (Advanced Mobile Phone Service) system to CDMA (Code Division Multiple access) system and PCS (Personal Communication Services) systems, etc., in order to support daily increasing subscribers and practically to escape from failed communication and call termination due the interference. However, the problem of air interference has remained in succession as an inevitable one.

In the conventional technologies rather than the present air interference measurement set (AIMS), instrumentation-equipment such as an electro magnetic strength measuring instrument (ESI) or radio frequency instrument (RFI) has been used. These systems/methods are only able to perform measurements at any one node of a cellular network and for any one node or one FA (Frequency Assignment) at once. Moreover, human-powered monitoring has been needed for extra data-backup equipment to continuously measure long-time air interference. Practically, the measurement method as stated above has left much to be desired to authorize the result of the measurement as absolute interference data for the base station constituting the cellular network, and requires considerably difficult stages.

The problems in the conventional method as stated above are summarized as follows: First, it is impossible to exactly gather interference data for the base station system. Second, the method and procedure for measurement is difficult. Third, it may result in a time-loss due to the separate measurement per-FA, and fourth, there is no absolute measurement equipment for measuring air interference of the base station.

U.S. Pat. No. 4,837,801 to Shimura, discloses a base station capable of monitoring occurrence of interference on every transmission. The systems uses a control radio wave monitoring circuit to monitor the control radio wave on transmission of an allocated one of the speech radio waves and to determine whether or not interference occurs in the control radio wave due to the transmission. When interference occurs in the control radio wave, the allocated speech radio wave is changed to another speech radio wave under the control of a line controller.

U.S. Pat. No. 5,603,093 to Yoshimi et al. discloses a method for monitoring the state of interference by a base station of a mobile radio communication system. The mobile station measures the field intensity and bit error rate (BER) of a downlink radio wave from a base station at each measurement timing and reports the results to the base station. The base station compares the measured results with a reference characteristic to determine if they are normal or not. The base station receives the measure results from the mobile station for a fixed period of time, and processes the results statistically to determine the state of interference.

SUMMARY OF THE INVENTION

The present invention is intended to provide an apparatus and method for measuring air interference of a base station, and more particularly an apparatus and method that makes it possible to automatically perform operations such as more exactly gathering, conveniently storing, analyzing, and long-time data gathering for air interference of a base station.

For solving the conventional problems, a preferable embodiment of the apparatus for measuring air interference of base station comprises: an RF (Radio Frequency) measurement path switch set to selectively measure each path and sector, which is outputted from the base station; a low noise amplifier (LNA) inputting the signal outputted from the RF (Radio Frequency) switch and amplifying the signal to be within an effective level; a control computer controlling a decoding unit and a spectrum analyzer as a core of the air interference measurement set (AIMS); a decoding unit which generates a decode-output to control the RF switch by receiving data from a parallel port of the control computer; and a spectrum analyzer for automatically performing the interference-measurement in a remote state by receiving the output signal of the low noise amplifier (LNA) and then transmitting and receiving data with the control computer through a general purpose interface bus.

According to the apparatus of present invention, the RF switch has 6 inputs to select an A B path of a maximum of 3 sectors. The RF switch has different frequency bands according to the kinds of base stations, such as, for example, digital cellular system and personal communication services system. The low noise amplifier (LNA) is different according to the kinds of base stations, and has a minimum 35 dB as a basic amplification gain and the output passing through the low noise amplifier (LNA) has a minimum −80 dB or more.

A decoding unit generates a decode-output and simultaneously generates decode-output for activating 7-segment LEDs (Light Emitted Diodes) to indicate the present switching point of the RF switch. The decoding unit receives 8-bit control data through a parallel port to control the RF switch and the decoding unit further includes a toggle switch to manually control the RF switch when there are no parallel inputs. A general notebook computer is used for the control computer, the general notebook personal computer having PCMCIA-GPIB (General Purpose Interface Bus) card.

For solving the conventional problems, a preferable embodiment of the method for measuring air interference of base station comprises a step of inputting a signal to the input port corresponding to each sector and path of an air interference measurement set (AIMS) through external connection ports. The signal being inputted through an antenna of the base station and being passed through a radio front end unit (RFEU) A and B path, and a step of inputting the output of the RF switch to a fixed attenuator. Each sector and path of the air interference measurement set (AIMS) is connected to 6 inputs of 6:1 (six to 1) RF switch respectively. The output signal of the fixed attenuator is amplified in the low noise amplifier (LNA) to such a level that it can be measured as channel power using a spectrum analyzer and the amplified signal is input to the RF input ports of the spectrum analyzer. The channel power of the FA 1.23 MHz band, for example, is measured the spectrum analyzer and the result is transmitted to the control computer. The channel power is presently input through the RF switch in the channel power measurement mode, and the spectrum analyzer is automatically set for default information including frequency measurement in response to control signals of the PCMCIA-GPIB port of the control computer. Data is stored in combination with the result of channel power measurement, and the present measurement time. A switching command is then sent through the parallel port to the decoding unit of the air interference measurement set (AIMS) by the control computer. The switching command is for switching the RF switch to the next measurement point. Once switched, the channel power is read for the corresponding path by the spectrum analyzer and the combined data is stored by the control computer, when the decoding unit switches the RF switch to the next point. The decoding unit receives the switching command and the control computer sets the spectrum analyzer to the next measurement FA. The steps for the measurement are repeated from the beginning, when the RF switch has moved between points six times.

According to the method of the present invention, the step of repeating the steps is continuously performed until the a stop command is inputted by a measurement operator and the channel power data of those times as interference of the frequency band, for example, FA 1.23 MHz, is stored in said control computer according to said point.

Other objects and advantages of the invention will become apparent upon reading the detailed description and upon reference to the drawings.

DESCRIPTION OF THE PREFERRED EMBODIMENTS

Figure 1:
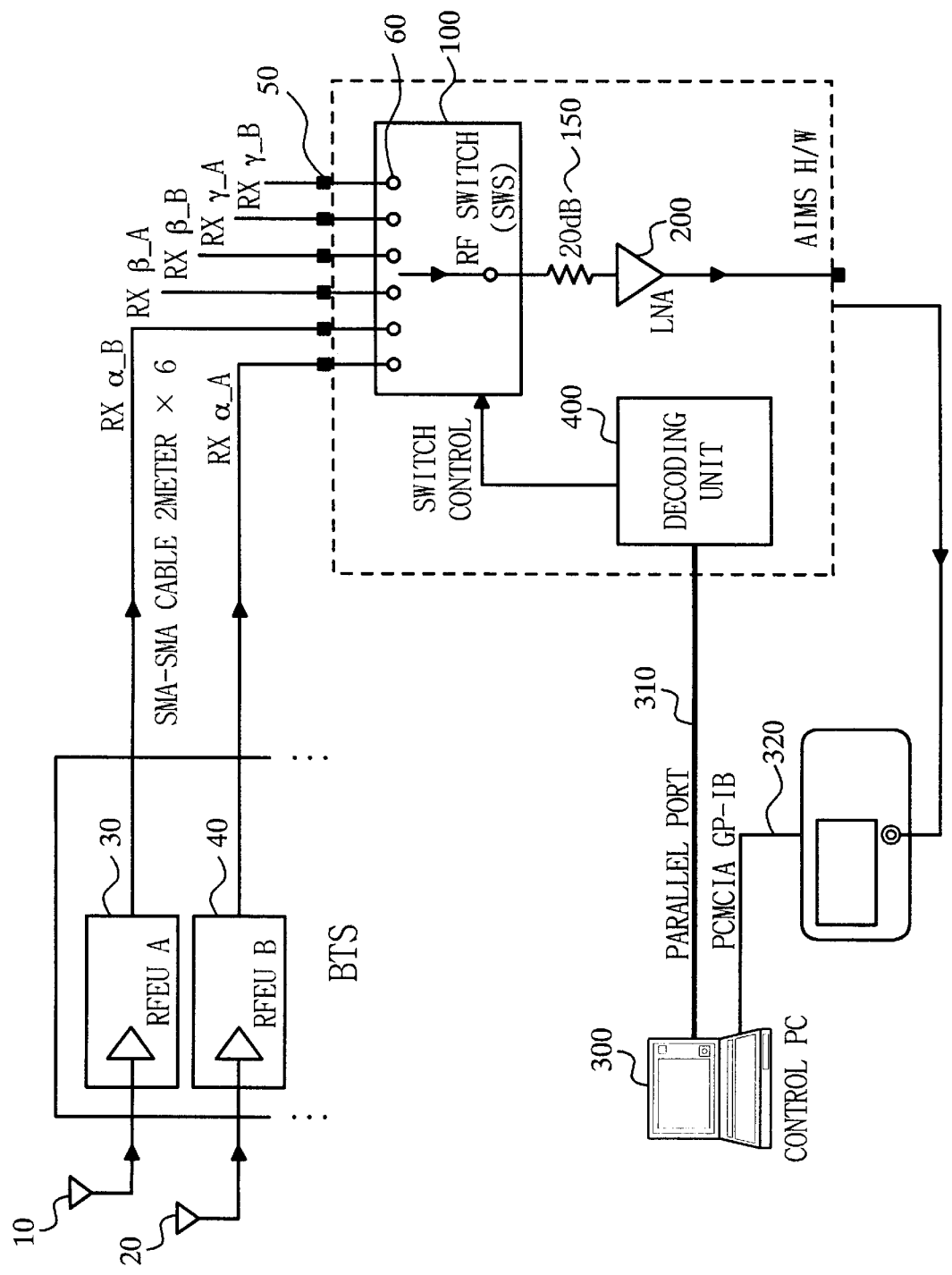
FIG. 1 shows a system diagram illustrating air interference measurement set (AIMS) according to the present invention.

FIG. 1 shows a system diagram illustrating an air interference measurement set (AIMS) 101 according to the present invention. As illustrated in FIG. 1, a preferable embodiment of the apparatus for measuring air interference of a base station of the present invention includes an RF switch 100, a low noise amplifier (LNA) 200, a decoding unit 400, a spectrum analyzer 500 and a control computer 300.

RF (Radio Frequency) switch 100 sets the measurement path to selectively measure each path and sector, which is outputted from the base station. The RF switch 100 has 6 inputs to select an A or B path of a maximum of 3 sectors and has different frequency bands according to the kinds of the base station, such as digital cellular system (DCS) and personal communication services (PCS) system.

Low noise amplifier (LNA) 200 inputs the signal output from the RF switch 100 and amplifies the signal to be within an effective level to be read in spectrum analyzer 500. The low noise amplifier (LNA) 200 used is different according to the kind of the base station being measured, such as digital cellular system and personal communication services system.

The low noise amplifier (LNA) 200 has a minimum of 35 dB as basic amplification gain and the output that passes through the low noise amplifier (LNA) 200 has a minimum of −80 dB or higher.

Control computer 300 controls decoding unit 400 and spectrum analyzer 500 as a core of the air interference measurement set (AIMS). A general notebook computer is used for the control computer 300 wherein the general notebook computer has PCMCIA-GPIB (General Purpose Interface Bus) 320 card. Control software included in the control computer 300 can be implemented by coding with a programming language such as, for example, Turbo C++.

Decoding unit 400 generates decode-output to control the RF switch 100 by receiving data from parallel port 310 of the control computer 300. The decoding unit 400 generates decode-output and simultaneously generates decode-output for activating a 7-segment LED (Light Emitted Diode) 410 (shown as switch position display 410 in FIG. 2) to indicate the switching point of the present RF switch 100 (see FIG. 2). The decoding unit 400 receives 8-bit control data through parallel port 310 to control the RF switch 100 and the decoding unit 400 further includes a toggle switch 420 (See FIG. 3) to manually control the RF switch 100 when there are no parallel inputs.

Spectrum analyzer 500 automatically performs interference-measurement in a remote state by receiving the output signal of the low noise amplifier (LNA) 200 and then transmitting and receiving data with the control computer 300 through the general purpose interface bus 320.

Figure 2:
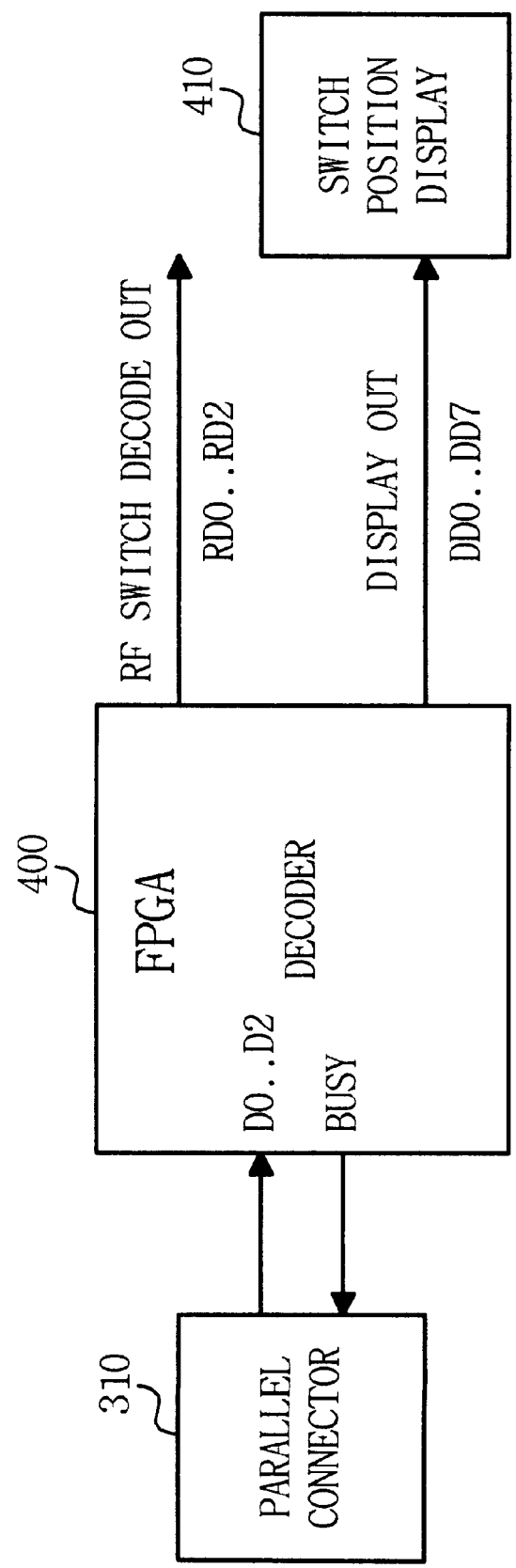
FIG. 2 illustrates a block diagram of a decoding unit of the air interference measurement set (AIMS) according to the present invention.

FIG. 2 illustrates a block diagram of decoding unit 400 of the air interference measurement set (AIMS) 101 according to the present invention. In FIG. 2, D0 . . . D2 is 3-bit control signal being inputted from parallel port 310 of control computer 300. The 3-bit control signal includes the information for RF switch control and switch position display output. BUSY is output information being inputted to control computer 300 through the parallel port 310 wherein it is used to determine whether the control computer 300 is connected. RD0 . . . RD2 is a 3-bit decoded signal for controlling RF switch 100 and DD0 . . . DD7 is an 8-bit signal to display the present status of the connection of RF switch 100.

Figure 3:
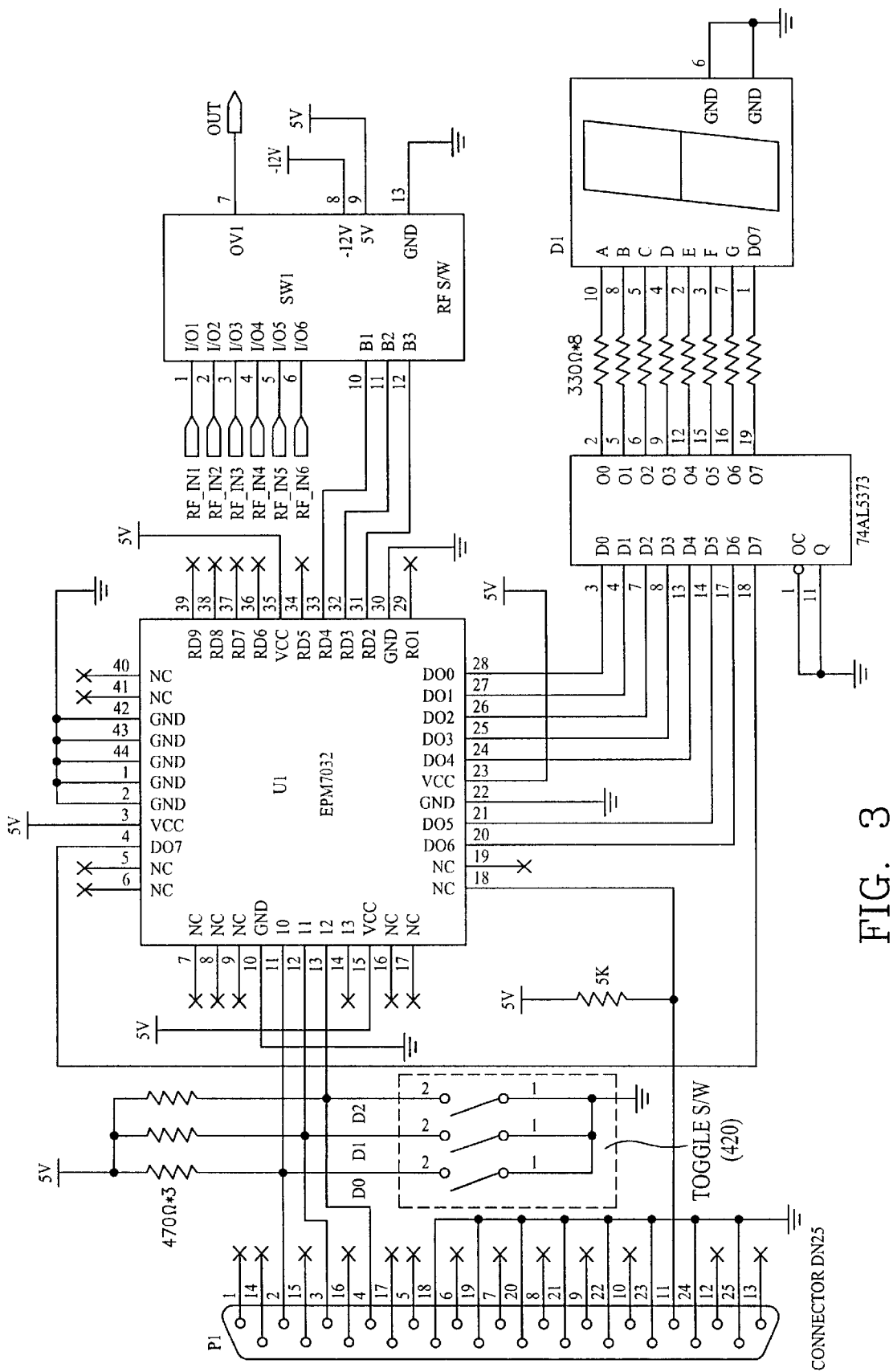
FIG. 3 shows a detailed schematic diagram of FIG. 2.

FIG. 3 shows a detailed schematic diagram of FIG. 2. Referring to FIG. 3, EPM7032 as an EPLD (Erasable Programmable logic device) of Altera Corporation is used for main core, and it controls RF switch 100 by receiving control data from parallel port 310. A toggle switch 420 is used to manually control the RF switch 100 when there are no parallel inputs. The measurement is performed in an open state for automatic measurement.

Figure 4:
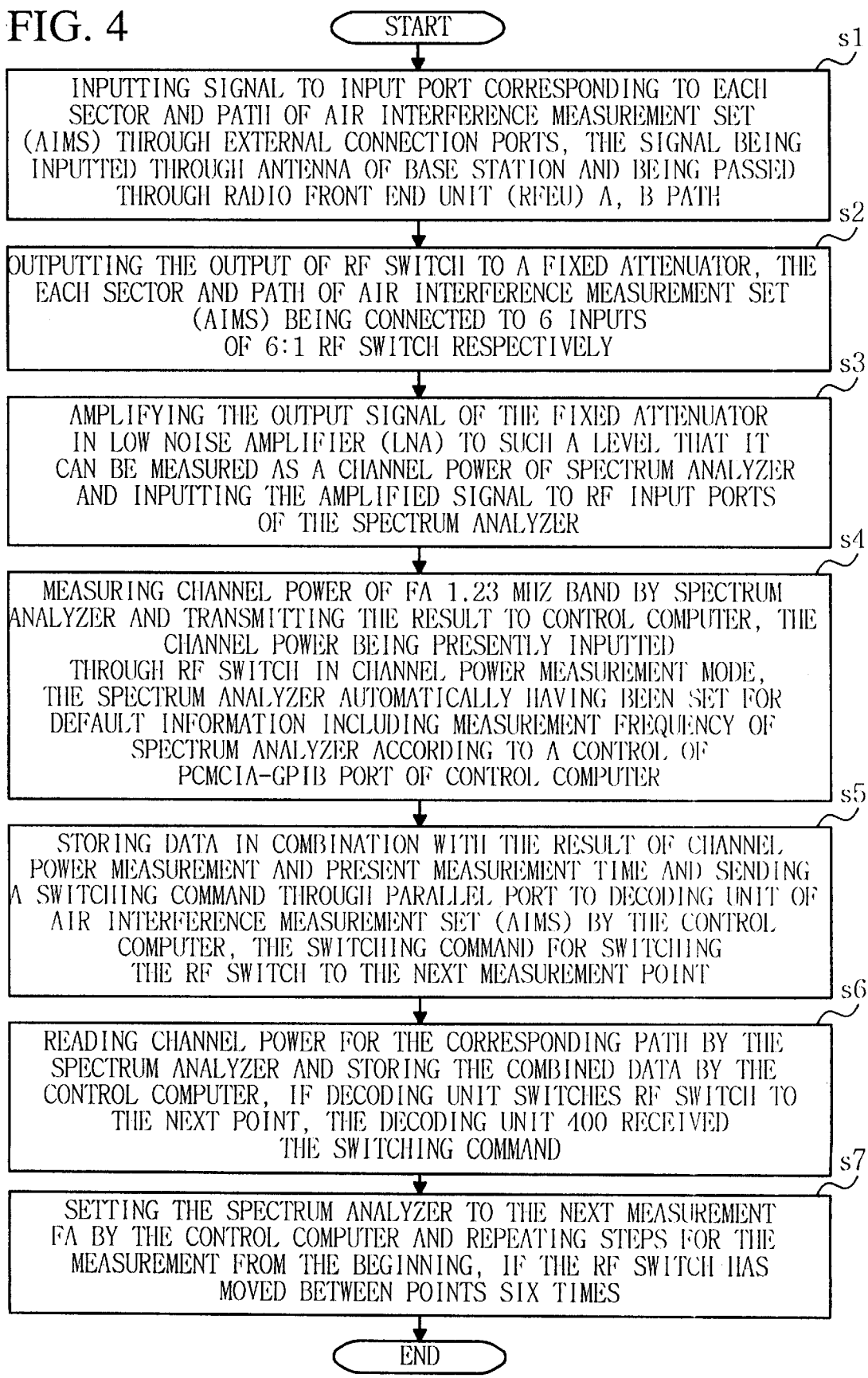
FIG. 4 shows a flow chart illustrating a method for measuring air interference of base station according to the present invention.

FIG. 4 shows a flow chart illustrating a method for measuring air interference of base station according to the present invention. A preferable embodiment of the method for measuring air interference of base station according to the present invention includes the steps of:

(a) inputting a signal to an input port 60 corresponding to each sector and path of air interference measurement set (AIMS) 101 through external connection ports 50, the signal being inputted through an antenna of base station and being passed through a radio front end unit (RFEU) A 30, B 40 path (s1);

(b) outputting the output of RF switch 100 to a fixed attenuator 150, each sector and path of air interference measurement set (AIMS) 101 being connected to 6 inputs of a 6:1 (six to 1) RF switch 100 respectively (s2);

(c) amplifying the output signal of the fixed attenuator 150 in a low noise amplifier (LNA) 200 to such a level that it can be measured as a channel power by spectrum analyzer 500, and inputting the amplified signal to RF input ports of the spectrum analyzer 500 (s3);

(d) measuring the channel power of FA 1.23 MHz band using spectrum analyzer 500 and transmitting the result to control computer 300, the channel power being presently input through RF switch 100 in channel power measurement mode, the spectrum analyzer 500 automatically having been set for default information including frequency measurement according to a control of the PCMCIA-GPIB 320 port of control computer 300 (s4);

(e) storing data in combination with the result of channel power measurement and present measurement time and sending a switching command through parallel port 310 to decoding unit 400 of air interference measurement set (AIMS) 101 by the control computer 300, the switching command for switching the RF switch 100 to the next measurement point (s5);

(f) reading channel power for the corresponding path by the spectrum analyzer 500 and storing the combined data by the control computer 300, when decoding unit 400 switches RF switch 100 to the next point, in response to receiving the switching command (s6); and (g) setting-the spectrum analyzer 500 to the next FA measurement by the control computer 300 and repeating the steps for the measurement from the beginning, when the RF switch 100 has moved between points six times (s7).

Repeating the steps is continuously performed until the time when a stop command is input by a measurement operator and the channel power data of those times as interference of the FA 1.23 MHz band is stored in the control computer 300.

The present invention as stated above has effects as follows:

First, it has an effect in that it can be applied to all of AMPS (Advanced Mobile Phone Service) systems, digital cellular systems and personal communication service systems from an aspect of practical use and in that the low noise amplifier (LNA) 200 of base station can directly extract the amount of interference being flown to the base station, therefore, it is possible to find absolute interference values and not relative values.

Second, with the air interference measurement set (AIMS) 101 it is possible to estimate cells after the establishment of a base station rather than during the development of base station, and to get the interference extent under the normal conditions or extract a specific interference source. For example, when the rate of call-setup of a base station comes down, it is possible to confirm, by using the air interference measurement set (AIMS) 101, that the extent of the interference of the base station under normal conditions is abnormally large compared to the general base station. Therefore, it is possible to work out a counter measure such that new optimized conditions for the base station are required. On the other hand, when the cause of air interference of a base station is expected for the problem of unstable output of the base station, when the air interference measurement set (AIMS) 101 test is performed to confirm that the interference extent of the base station is normal, it is possible to investigate the problem from other aspects.

While the invention is susceptible to various modification and alternative forms, specific embodiments thereof have been shown by way of example in the drawings and will be herein be described in detail. It should be understood, however, that it is not intended to limit the invention to the particular forms disclosed, but on the contrary, the intention is to cover all modification, equivalents, and alternatives falling within the spirit and scope of the invention as defined by the appended claims.

What is claimed is:

1. An apparatus for measuring air interference of a base station at said base station comprising:

an RF (Radio Frequency) switch having inputs to select one path of a plurality of sectors, for setting a measurement path to selectively measure each path and sector a low noise amplifier (LNA) receiving an input signal output from said RF switch and amplifying said signal to be within an effective level and to be read in a spectrum analyzer;

a control computer for controlling a decoding unit and said spectrum analyzer as a core of an air interference measurement set (AIMS);

the decoding unit generating a decode-output to control said RF switch by receiving data from a parallel port of said control computer; and the spectrum analyzer automatically performing interference-measurement in a remote state by receiving an output signal of said low noise amplifier (LNA) and then transmitting and receiving data with said control computer through a general purpose interface bus.

2. The apparatus as set forth in claim 1, wherein said RF switch has 6 inputs to select an A or B path of a maximum of 3 sectors.

3. The apparatus as set forth in claim 2, wherein said RF switch has different frequency bands according to the kinds of said base station.

4. The apparatus as set forth in claim 1, wherein said low noise amplifier (LNA) is different according to the kinds of said base station.

5. The apparatus as set forth in claim 4, wherein said low noise amplifier (LNA) has a minimum basic amplification gain of 35 dB, and the output passing through said low noise amplifier (LNA) has a minimum of −80 dB.

6. The apparatus as set forth in claim 1, wherein said decoding unit further comprises a 7-segment LED to indicate a switching point of the RF switch, said decoding unit generating a decode-output for activating the 7-segment LED.

7. The apparatus as set forth in claim 6, wherein said decoding unit receives 8-bit control data through the parallel port to control said RF switch and said decoding unit further comprises a toggle switch to manually control said RF switch when there are no parallel inputs.

8. The apparatus as set forth in claim 1, wherein said control computer comprises a general notebook personal computer having a PCMCIA-GPIB (General Purpose Interface Bus) card.

9. A method for measuring air interference of a base station comprising the steps of:

a) inputting a signal through an antenna of the base station, said input signal being passed through a radio front end unit (RFEU) A, B path to an input port corresponding to each sector and path of an air interference measurement set (AIMS) through external connection ports;

b) outputting the output of a 6:1 RF (Radio Frequency) switch to a fixed attenuator, each sector and path of the air interference measurement set (AIMS) being connected to 6 inputs of the 6:1 (six to 1) RF switch respectively;

c) amplifying an output signal of said fixed attenuator in a low noise amplifier (LNA) to such a level that it can be measured as a channel power by a spectrum analyzer and inputting the amplified signal to RF input ports of said spectrum analyzer;

d) measuring channel power of an assigned frequency band (FA) and transmitting the result to a control computer, said channel power being presently input through the RF switch in a channel power measurement mode, said spectrum analyzer having been set for default information including frequency measurement according to a control of the PCMCIA-GPIB port of control computer;

e) storing data in combination with said result of channel power measurement and present measurement time, and sending a switching command through the parallel port to a decoding unit of the air interference measurement set (AIMS) by said control computer, said switching command for switching said RF switch to a next measurement point;

f) reading channel power for the corresponding path and storing the combined data when the decoding unit switches the RF switch to the next point, said decoding unit having received said switching command; and g) setting the spectrum analyzer to the next FA measurement by said control computer and repeating steps for the measurement from the beginning, when said RF switch has moved between points six times.

10. The method as forth in claim 9, wherein the repeating of steps is performed continuously until a stop command is input by a measurement operator and the channel power data of those times as interference of assigned frequency band (FA) is stored in said control computer according to said point.

11. An apparatus for measuring air interference of a base station comprising:

an RF (Radio Frequency) switch setting a measurement path to selectively measure each path and sector, which is output from said base station;

a low noise amplifier (LNA) for inputting a signal output from said RF switch and amplifying said signal to be within an effective level and to be read in a spectrum analyzer;

a control computer for controlling a decoding unit and said spectrum analyzer as a core of an air interference measurement set (AIMS);

the decoding unit generating a decode-output to control said RF switch by receiving data from a parallel port of said control computer; and the spectrum analyzer automatically performing interference-measurement in a remote state by receiving an output signal of said low noise amplifier (LNA) and then transmitting and receiving data with said control computer through a general purpose interface bus, wherein said RF switch, low noise amplifier, control computer, decoding unit and spectrum analyzer are located in the base station.

* * * * *